US012400784B2

(12) United States Patent
Yen

(10) Patent No.: US 12,400,784 B2
(45) Date of Patent: Aug. 26, 2025

(54) INDUCTOR DEVICE

(71) Applicant: Realtek Semiconductor Corporation, Hsinchu (TW)

(72) Inventor: Hsiao-Tsung Yen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 846 days.

(21) Appl. No.: 17/647,466

(22) Filed: Jan. 9, 2022

(65) Prior Publication Data

US 2023/0055317 A1 Feb. 23, 2023

(30) Foreign Application Priority Data

Aug. 20, 2021 (TW) ................................ 110130908

(51) Int. Cl.
*H01F 27/28* (2006.01)
*H01F 17/00* (2006.01)
*H01F 27/29* (2006.01)

(52) U.S. Cl.
CPC ......... *H01F 27/29* (2013.01); *H01F 17/0013* (2013.01); *H01F 2017/0073* (2013.01)

(58) Field of Classification Search
CPC ...................................................... H01F 27/29
USPC ........................................ 336/200, 232, 225
See application file for complete search history.

(56) References Cited

U.S. PATENT DOCUMENTS

| | | | | |
|---|---|---|---|---|
| 6,380,821 | B1 * | 4/2002 | Imbornone | H03H 7/422 336/200 |
| 10,186,364 | B2 | 1/2019 | Yen et al. | |
| 2019/0279809 | A1 | 9/2019 | Yen | |
| 2019/0392980 | A1 * | 12/2019 | Yen | H01F 27/2828 |

FOREIGN PATENT DOCUMENTS

TW 201931665 A 8/2019

OTHER PUBLICATIONS

English translation of TWI692780 (Year: 2020).*

* cited by examiner

*Primary Examiner* — Ronald Hinson
(74) *Attorney, Agent, or Firm* — CKC & Partners Co., LLC

(57) ABSTRACT

An inductor device includes a first trace, a second trace, and a connection member. The first inductor includes a first trace and a second trace. The shape of one of the first trace and the second trace is spiral. The second inductor includes a third trace and a fourth trace. The connection member is configured to couple the first inductor and the second inductor.

17 Claims, 8 Drawing Sheets

1000

INDUCTOR DEVICE

RELATED APPLICATIONS

This application claims priority to and the benefit of Taiwan Application Serial Number 110130908, filed on Aug. 20, 2021, the entire contents of which are incorporated herein by reference as if fully set forth below in its entirety and for all applicable purposes.

BACKGROUND

Field of Invention

The present disclosure relates to an electronic device. More particularly, the present disclosure relates to an inductor device.

Description of Related Art

The various types of inductors according to the prior art have their advantages and disadvantages. For example, a spiral inductor has a higher Q value and a larger mutual inductance. However, coupling is occurred between a spiral inductor and other devices. For an eight-shaped inductor/transformer which has two sets of coils, the coupling between the two sets of coils is relatively low. However, an eight-shaped inductor/transformer occupies a larger area in a device. In addition, when an eight-shaped inductor/transformer is designed to be a symmetrical structure, patristic capacitances of differential signals of the eight-shaped inductor/transformer increase substantially due to traditional crossing structures. Therefore, the scopes of application of the above inductor/transformer are limited.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure is to provide an inductor device. The inductor device comprises a first inductor, a second inductor, and a connection portion. The first inductor comprises a first trace and a second trace. The second inductor comprises a third trace and a fourth trace. A shape of one of the first trace and the second trace comprises a spiral. The third trace and the fourth trace are symmetrical to each other. The connection portion is configured to couple to the first inductor and the second inductor.

Therefore, based on the technical content of the present disclosure, the parasitic capacitance can be decrease owing to the disposition of the inductor device of the present disclosure. The differential signals of the symmetrical circuit are inputted at the same side, for example, the positive voltage signal or the negative voltage signal (P or N) are inputted at the same side. A new design, which adopts the positive voltage signals which are adjacent to each other (P and P are adjacent to each other), can avoid the capacitance generated by the positive voltage signal and the negative voltage signal which are adjacent to each other (N/P are adjacent to each other) in a traditional manner. Therefore, the parasitic capacitance decreases owing to the disposition of the inductor device of the present disclosure, such that the quality factor (Q factor) enhances and the summarization of the structure increases.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

Figure 1:
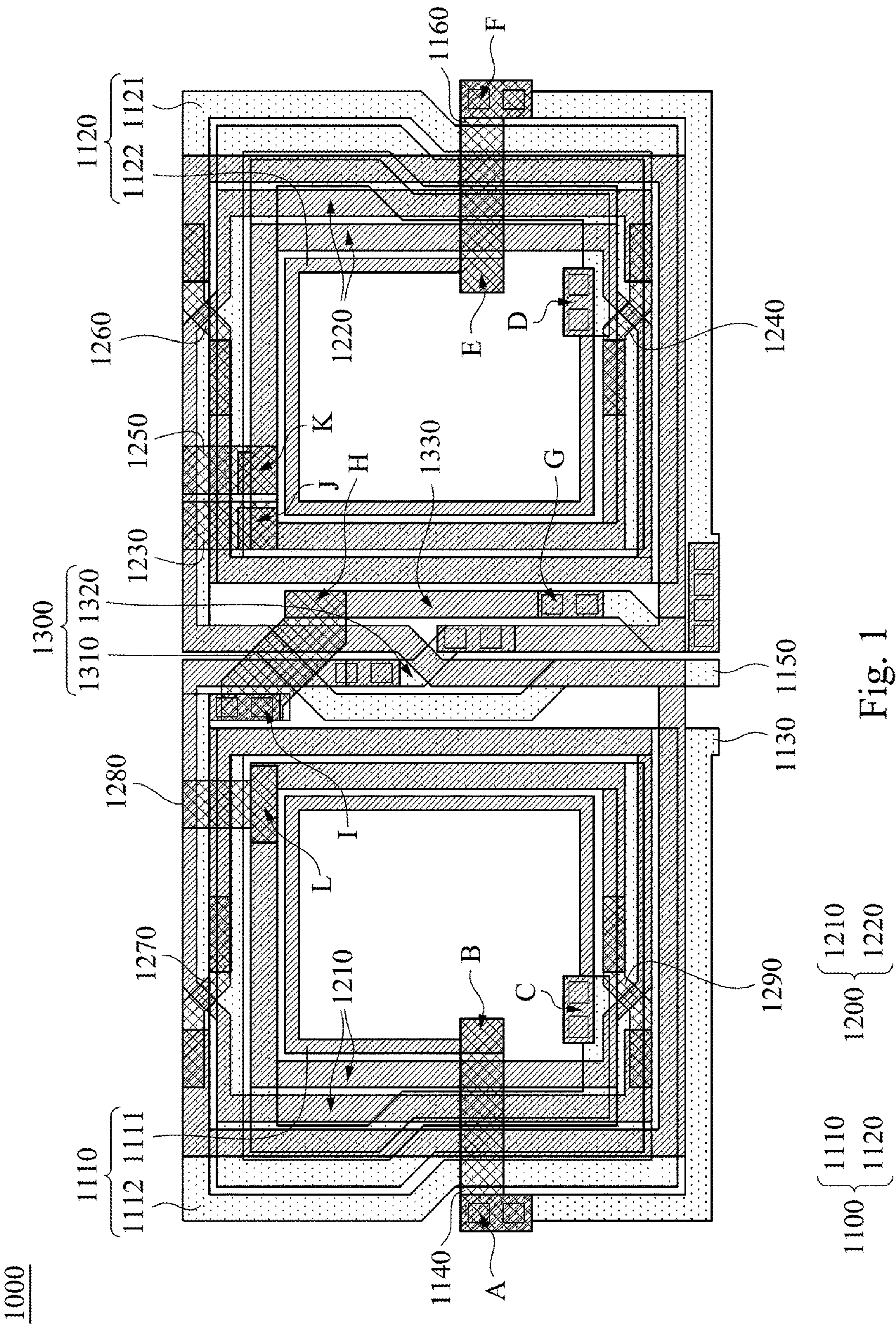
FIG. 1 depicts a schematic diagram of an inductor device according to one embodiment of the present disclosure.

FIG. 1 depicts a schematic diagram of an inductor device 1000 according to one embodiment of the present disclosure. As shown in the figure, the inductor device 1000 includes a first inductor 1100, a second inductor 1200, and a connection portion 1300. The first inductor 1100 includes a first trace 1110 and a second trace 1120. The second inductor 1200 includes a third trace 1210 and a fourth trace 1220. As shown in the figure, the connection portion 1300, which is located on a central area, can be configured to couple to the first inductor 1100 and the second inductor 1200.

Figure 2:
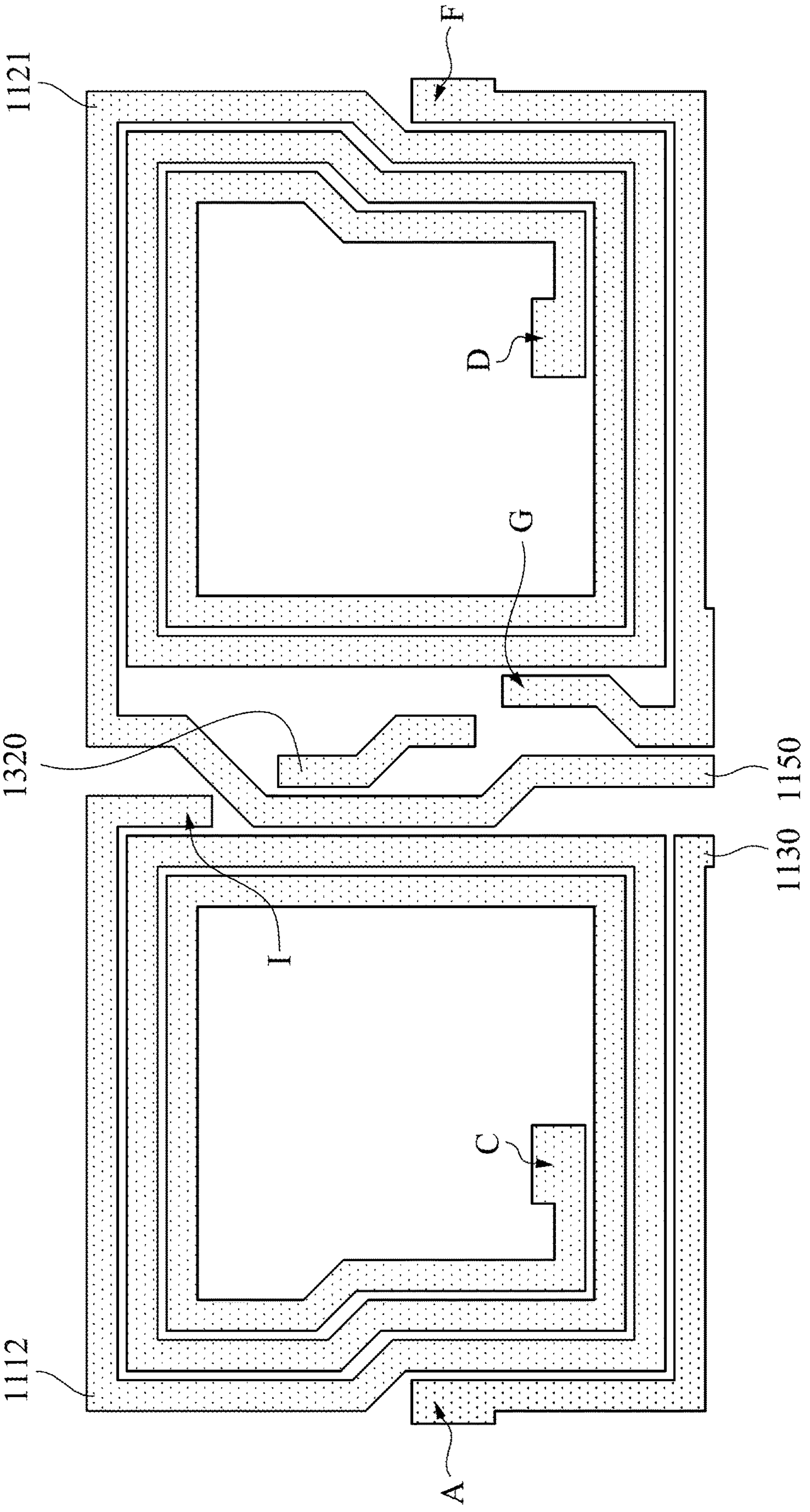
FIG. 2 depicts a schematic diagram of a portion structure of the inductor device shown in FIG. 1 according to one embodiment of the present disclosure.
Figure 3:
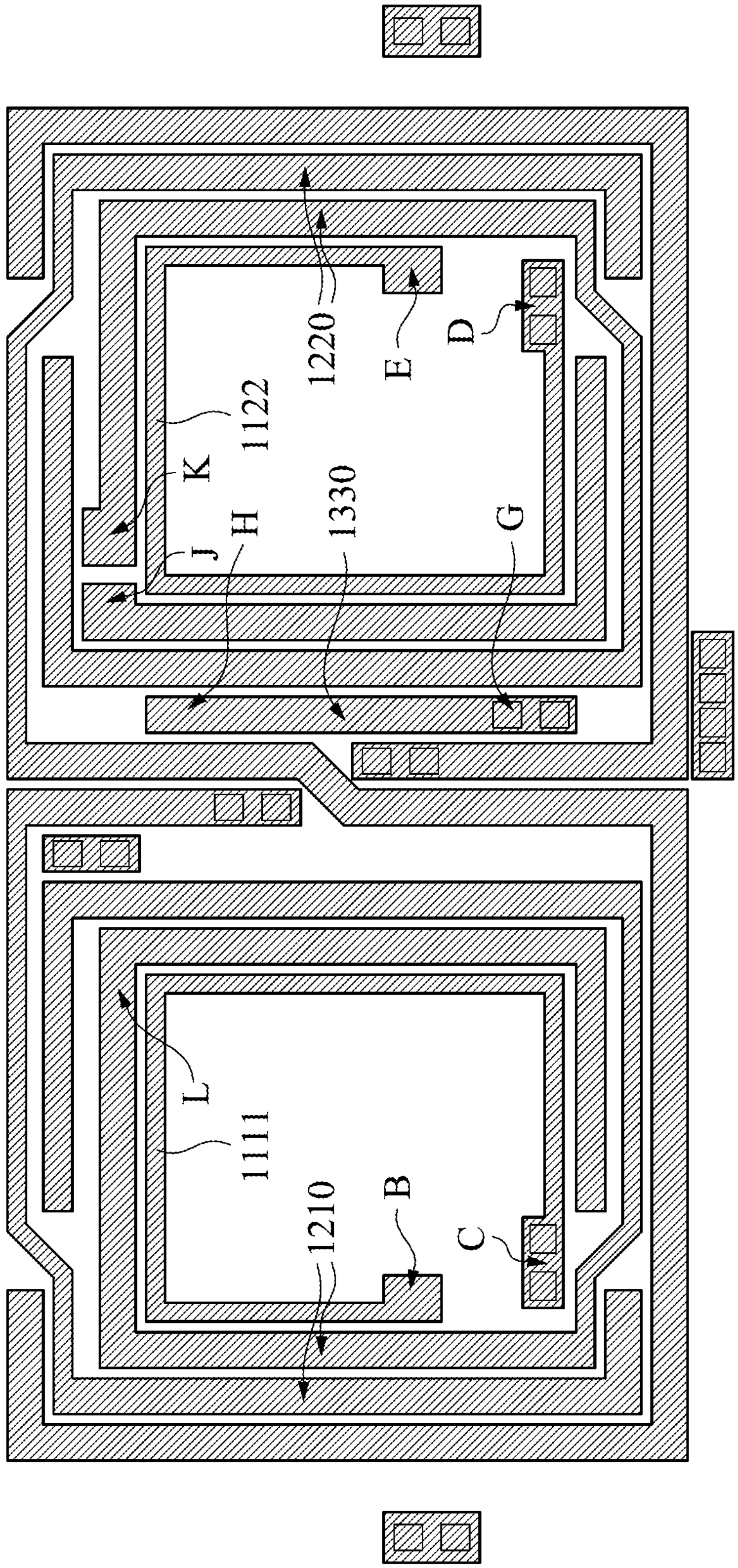
FIG. 3 depicts a schematic diagram of a portion structure of the inductor device shown in FIG. 1 according to one embodiment of the present disclosure.
Figure 4:
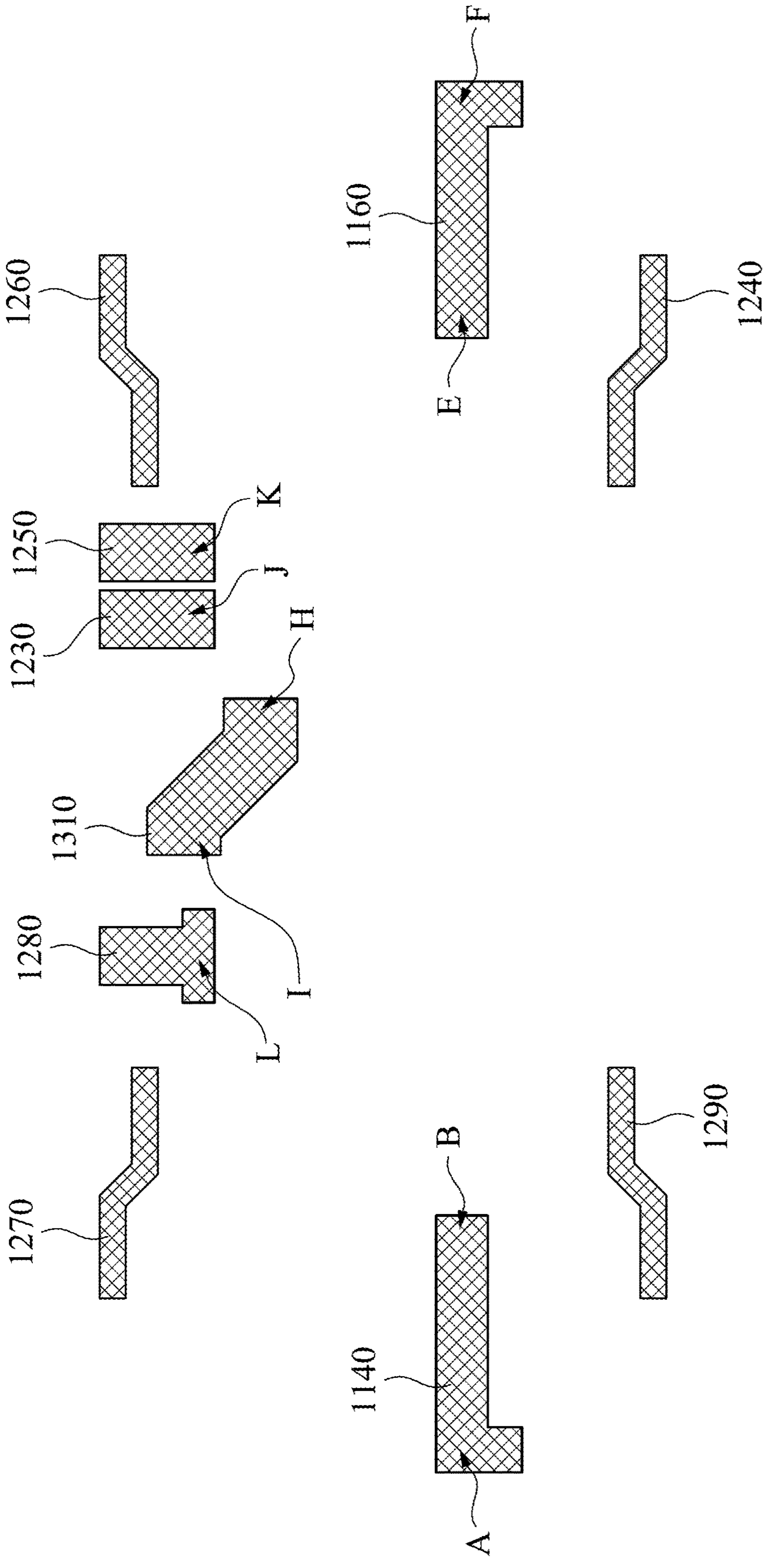
FIG. 4 depicts a schematic diagram of a portion structure of the inductor device shown in FIG. 1 according to one embodiment of the present disclosure.

For facilitating the understanding of the inductor device 1000 in FIG. 1, reference is now made to both FIG. 2 to FIG. 4. FIG. 2 to FIG. 4 depict schematic diagrams of a portion structure of the inductor device 1000 shown in FIG. 1 according to one embodiment of the present disclosure. As shown in FIG. 2, in one embodiment, the shape of one of the portion trace 1112 of the first trace 1110 and the portion trace 1121 of the second trace 1120 can be spiral. For example, the shape of one of the portion trace 1112 and the portion trace 1121 can be spiral, or the shapes of both of the portion trace 1112 and the portion trace 1121 are spiral.

As shown in FIG. 3, in one embodiment, the third trace 1210 and the fourth trace 1220 are symmetrical to each other. Specifically, the third trace 1210 and the fourth trace 1220 are symmetrical to each other on the basis of the central area of the inductor device 1000.

In one embodiment, the portion structure of the inductor device 1000 shown in FIG. 2 is located on a first layer, the portion structure of the inductor device 1000 shown in FIG. 3 is located on a second layer, and the portion structure of the inductor device 1000 shown in FIG. 4 is located on a third layer. For example, referring to FIG. 2, the portion trace 1112 of the first trace 1110, the portion trace 1121 of the second trace 1120, and the portion connection portion 1320 of the connection portion 1300 are located on the first layer.

In addition, referring to FIG. 3, the portion trace 1111 of the first trace 1110, the portion trace 1122 of the second trace 1120, the third trace 1210, and the fourth trace 1220 are located on the second layer. Besides, referring to FIG. 4, the first sub-connection portion 1310 of the connection portion 1300 is located on the third layer. Furthermore, the third layer shown in FIG. 4 further includes a plurality of connection members 1140, 1160, 1240, 1260, 1270, 1290, input/output terminals 1230, 1250, and a center-tapped terminal 1280. The above-mentioned structures will be described in detail as shown below. As described above, all structures of the inductor device 1000 of the present disclosure are located on three layers. Compared with the traditional inductor device adopting four layers for including all structures, the inductor device 1000 of the present disclosure can save area, volume, and so on, and the inductor device 1000 of the present disclosure merely needs three layers for including all structures, such that the design of the circuit becomes easier.

In one embodiment, the first trace 1110 can be the first spiral trace 1110, and the first spiral trace 1110 is disposed on the first layer and the second layer. For example, the portion trace 1112 of the first spiral trace 1110 is disposed on the first layer shown in FIG. 2, and the portion trace 1111 of the first spiral trace 1110 is disposed on the second layer shown in FIG. 3.

In another embodiment, the first inductor 1100 further includes a first input/output terminal 1130 and a first connection member 1140. The first input/output terminal 1130 is disposed on the first layer shown in FIG. 2, and the first connection member 1140 is disposed on the third layer shown in FIG. 4. With respect to the connection structure, the node A which is disposed on the first input/output terminal 1130 shown in FIG. 2 is coupled to the node A which is disposed on the first connection member 1140 shown in FIG. 4. Subsequently, the node B of the first connection member 1140 is coupled to the node B which is disposed on the portion trace 1111 of the first spiral trace 1110 shown in FIG. 3. After that, the node C of the portion trace 1111 of the first spiral trace 1110 is coupled to the node C which is disposed on the portion trace 1112 of the first spiral trace 1110 shown in FIG. 2.

In one embodiment, the second trace 1120 can be the second spiral trace 1120, and the second spiral trace 1120 is disposed on the first layer and the second layer. For example, the portion trace 1121 of the second spiral trace 1120 is disposed on the first layer shown in FIG. 2, and the portion trace 1122 of the second spiral trace 1120 is disposed on the second layer shown in FIG. 3.

In another embodiment, the first inductor 1100 further includes a second input/output terminal 1150 and a second connection member 1160. The second input/output terminal 1150 is disposed on the first layer shown in FIG. 2, and the second connection member 1160 is disposed on the third layer shown in FIG. 4. With respect to the connection structure, the second input/output terminal 1150 shown in FIG. 2 is coupled to the portion trace 1121 of the second spiral trace 1120 which is also shown in FIG. 2. The node D of the portion trace 1121 of the second spiral trace 1120 is coupled to the node D which is disposed on the portion trace 1122 of the second spiral trace 1120 shown in FIG. 3. Subsequently, the node E of the portion trace 1122 of the second spiral trace 1120 is coupled to the node E which is disposed on the second connection member 1160 shown in FIG. 4.

Next, the node F of the second connection member 1160 is coupled to the node F which is disposed on the portion trace 1121 of the second spiral trace 1120 shown in FIG. 2. The node G of the portion trace 1121 of the second spiral trace 1120 is coupled to the node G of the connection member 1330 shown in FIG. 3. Subsequently, the node H of the connection member 1330 is coupled to the node H which is disposed on the first sub-connection portion 1310 of the connection portion 1300 shown in FIG. 4. The node I of the first sub-connection portion 1310 of the connection portion 1300 is coupled to the node I which is disposed on the portion trace 1112 of the first spiral trace 1110 shown in FIG. 2.

In one embodiment, the second inductor 1200 further includes a third input/output terminal 1230 and a third connection member 1240. The third input/output terminal 1230 is disposed on the third layer shown in FIG. 4, and the third connection member 1240 is disposed on the third layer shown in FIG. 4. With respect to the connection structure, the node J which is disposed on the third input/output terminal 1230 shown in FIG. 4 is coupled to the node J which is disposed on the fourth trace 1220 shown in FIG. 3. The fourth trace 1220, which is located on the second layer, is coupled through the third connection member 1240 to the fourth trace 1220, which is also located on the second layer, in an interlaced manner.

In another embodiment, referring to FIG. 1, the portion trace 1121 of the second spiral trace 1120 located on the first layer and the fourth trace 1220 located on the second layer are overlapped to each other partially.

In one embodiment, the second inductor 1200 further includes a fourth input/output terminal 1250 and a fourth connection member 1260. The fourth input/output terminal 1250 is disposed on the third layer shown in FIG. 4, and the fourth connection member 1260 is disposed on the third layer shown in FIG. 4. With respect to the connection structure, the node K which is disposed on the fourth input/output terminal 1250 shown in FIG. 4 is coupled to the node K which is disposed on the fourth trace 1220 shown in FIG. 3. The fourth trace 1220 is coupled through the fourth connection member 1260 to the fourth trace 1220 which is also located on the second layer in an interlaced manner. In another embodiment, the third connection member 1240 and the fourth connection member 1260 are located at different sides of the second inductor 1200. For example, the third connection member 1240 and the fourth connection member 1260 are located at the lower side and the upper side of the second inductor 1200 respectively.

In another embodiment, in the central area (e.g. the center of the structure shown in the figure) of the inductor device 1000, the third trace 1210 which is disposed on the second layer shown in FIG. 3 is coupled to the fourth trace 1220 which is also located on the second layer.

In one embodiment, the second inductor 1200 further includes a fifth connection member 1270, and the fifth connection member 1270 is disposed on the third layer shown in FIG. 4. With respect to the connection structure, the third trace 1210 shown in FIG. 3 is coupled through the fifth connection member 1270 shown in FIG. 4 to the third trace 1210 which is also located on the second layer in an interlaced manner.

In another embodiment, referring to FIG. 1, the portion trace 1112 of the first spiral trace 1110 located on the first layer and the third trace 1210 located on the second layer are overlapped to each other partially.

In one embodiment, the second inductor 1200 further includes a center-tapped terminal 1280, and the center-tapped terminal 1280 is disposed on the third layer shown in FIG. 4. With respect to the connection structure, the node L which is disposed on the center-tapped terminal 1280 shown in FIG. 4 is coupled to the node L which is disposed on the third trace 1210 shown in FIG. 3.

In another embodiment, referring to FIG. 1, the center-tapped terminal 1280 is symmetrical to the third input/output terminal 1230 and the fourth input/output terminal 1250 on the basis of the central area (e.g. the center of the structure shown in the figure) of the inductor device 1000.

In one embodiment, the second inductor 1200 further includes a sixth connection member 1290, and the sixth connection member 1290 is disposed on the third layer shown in FIG. 4. With respect to the connection structure, the third trace 1210 in FIG. 3 is coupled through the sixth connection member 1290 shown in FIG. 4 to the third trace 1210 which is also located on the second layer in an interlaced manner. In another embodiment, the fifth connection member 1270 and the sixth connection member 1290 are disposed at different sides of the second inductor 1200. For example, the fifth connection member 1270 and the sixth connection member 1290 are located at the upper side and the lower side of the second inductor 1200 respectively.

In another embodiment, the connection portion 1300 further includes a second sub-connection portion 1320, and the second sub-connection portion 1320 is disposed on the first layer shown in FIG. 2. As shown in FIG. 1, in the central area (e.g. the center of the structure shown in the figure) of the inductor device 1000, the third trace 1210 located on the second layer is coupled through the second sub-connection portion 1320 to the fourth trace 1220 located on the second layer. It is noted that the present disclosure is not limited to the structure as shown in FIGS. 1 to 4, and it is merely an example for illustrating one of the implements of the present disclosure.

Figure 5:
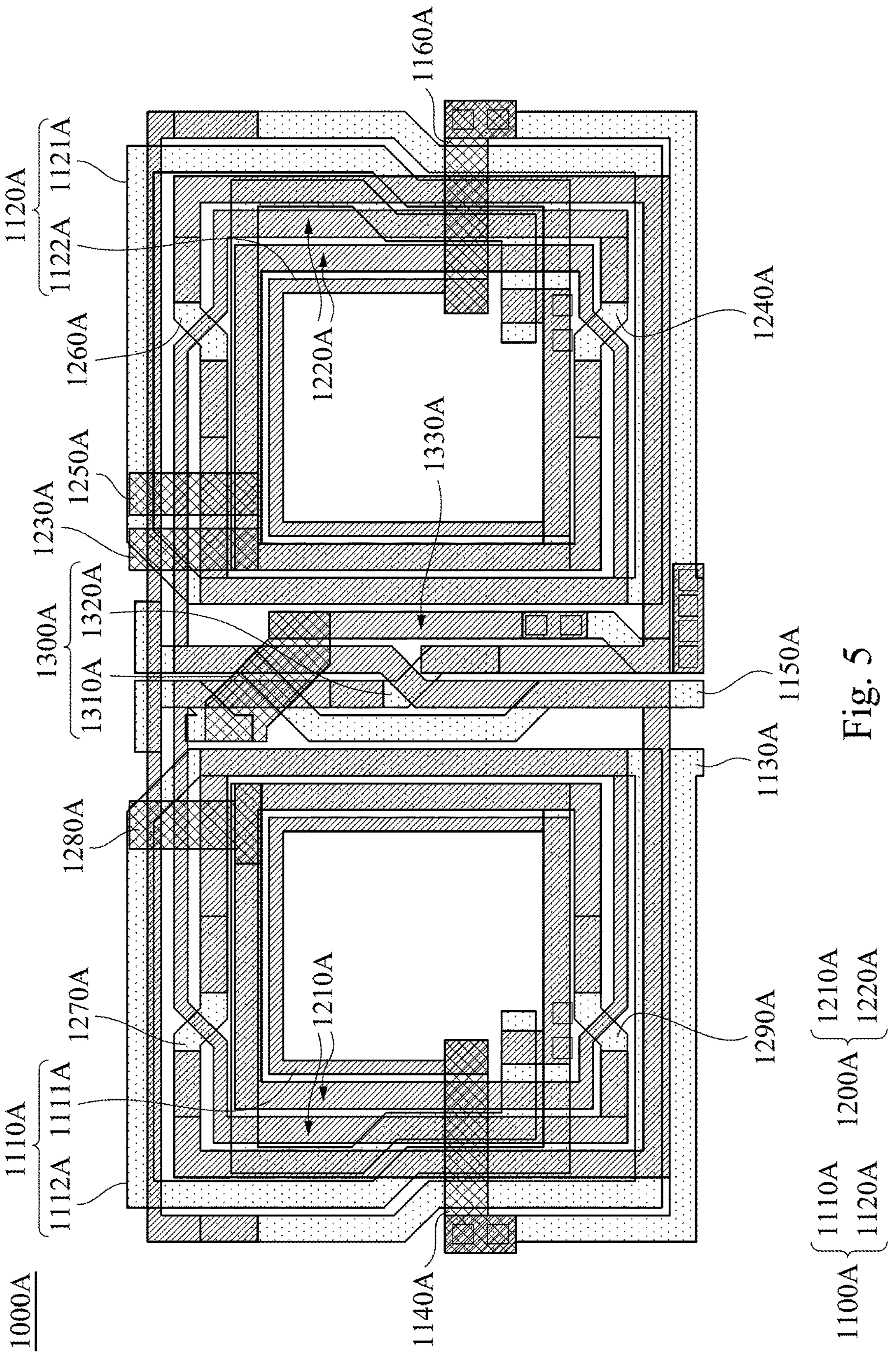
FIG. 5 depicts a schematic diagram of an inductor device according to one embodiment of the present disclosure.

FIG. 5 depicts a schematic diagram of an inductor device 1000A according to one embodiment of the present disclosure. Compared with the inductor device 1000 shown in FIG. 1, the structure disposition of the inductor device 1000A shown in FIG. 5 is different, which will be described in detail as below.

Referring to FIG. 5, the structure between the first trace 1110A and the third trace 1210A of the inductor device 1000A is adjusted, so as to make the fifth connection member 1270A located at the upper-left corner in the figure to be disposed on the first layer, and make the sixth connection member 1290A located at the lower-left corner in the figure to be disposed on the first layer.

Besides, the structure between the second trace 1120A and the fourth trace 1220A of the inductor device 1000A is adjusted, so as to make the fourth connection member 1260A located at the upper-right corner in the figure to be disposed on the first layer, and make the third connection member 1240A located at the lower-right corner in the figure to be disposed on the first layer. It is noted that the element in FIG. 5, whose symbol is similar to the symbol of the element in FIG. 1, has similar structure feature in connection with the element in FIG. 1. Therefore, a detail description regarding the structure feature of the element in FIG. 5 is omitted herein for the sake of brevity. In addition, the present disclosure is not limited to the structure as shown in FIG. 5, and it is merely an example for illustrating one of the implements of the present disclosure.

Figure 6:
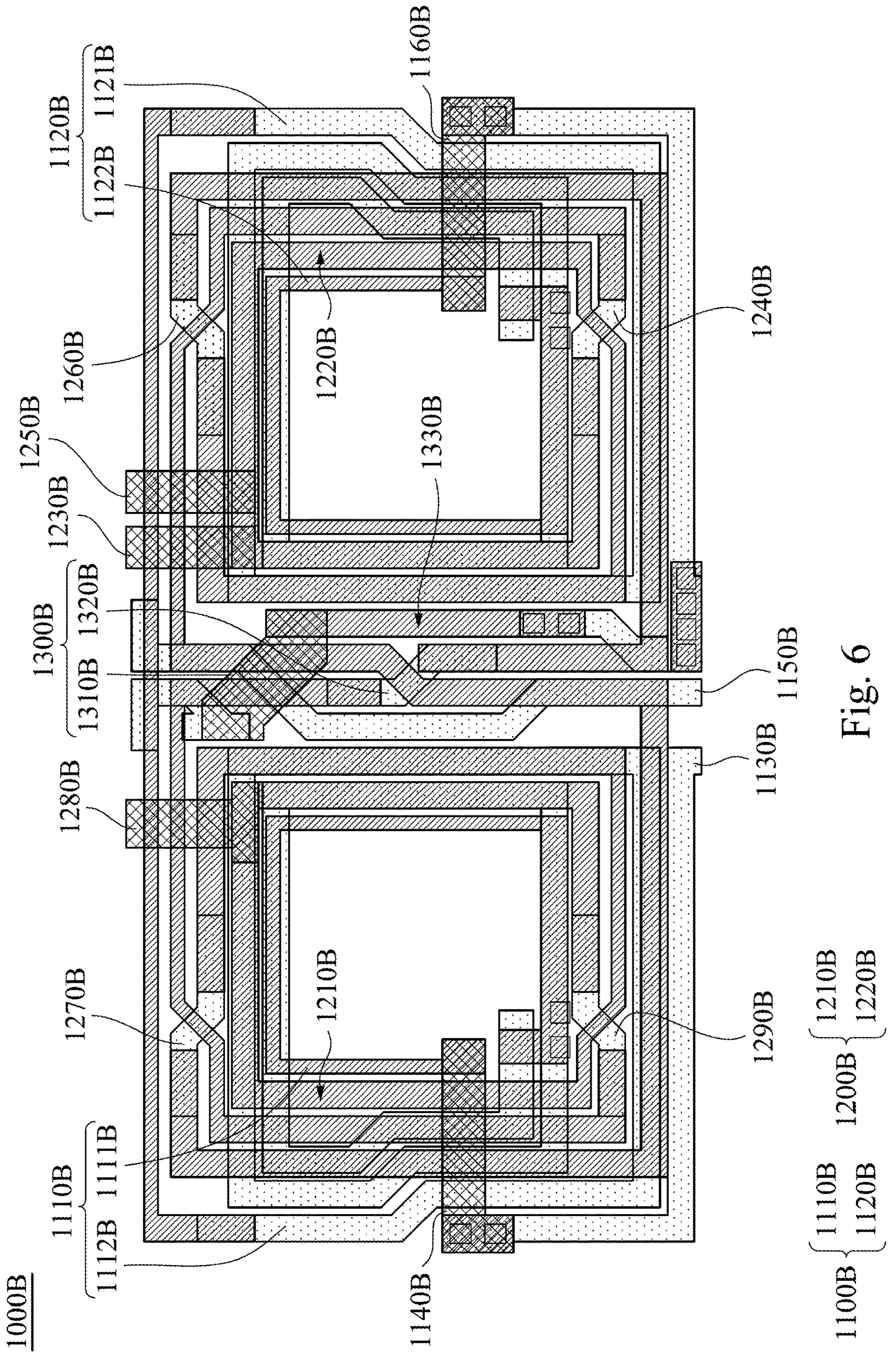
FIG. 6 depicts a schematic diagram of an inductor device according to one embodiment of the present disclosure.

FIG. 6 depicts a schematic diagram of an inductor device 1000B according to one embodiment of the present disclosure. Compared with the inductor device 1000 shown in FIG. 1, the structure disposition of the inductor device 1000B shown in FIG. 6 is different, which will be described in detail as below.

Referring to FIG. 6, the structure between the first trace 1110B and the third trace 1210B of the inductor device 1000B is adjusted, so as to make the fifth connection member 1270B located at the upper-left corner in the figure to be disposed on the first layer, and make the sixth connection member 1290B located at the lower-left corner in the figure to be disposed on the first layer.

Besides, the structure between the second trace 1120B and the fourth trace 1220B of the inductor device 1000B is adjusted, so as to make the fourth connection member 1260B located at the upper-right corner in the figure to be disposed on the first layer, and make the third connection member 1240B located at the lower-right corner in the figure to be disposed on the first layer. It is noted that the element in FIG. 6, whose symbol is similar to the symbol of the element in FIG. 1, has similar structure feature in connection with the element in FIG. 1. Therefore, a detail description regarding the structure feature of the element in FIG. 6 is omitted herein for the sake of brevity. In addition, the present disclosure is not limited to the structure as shown in FIG. 6, and it is merely an example for illustrating one of the implements of the present disclosure.

Figure 7:
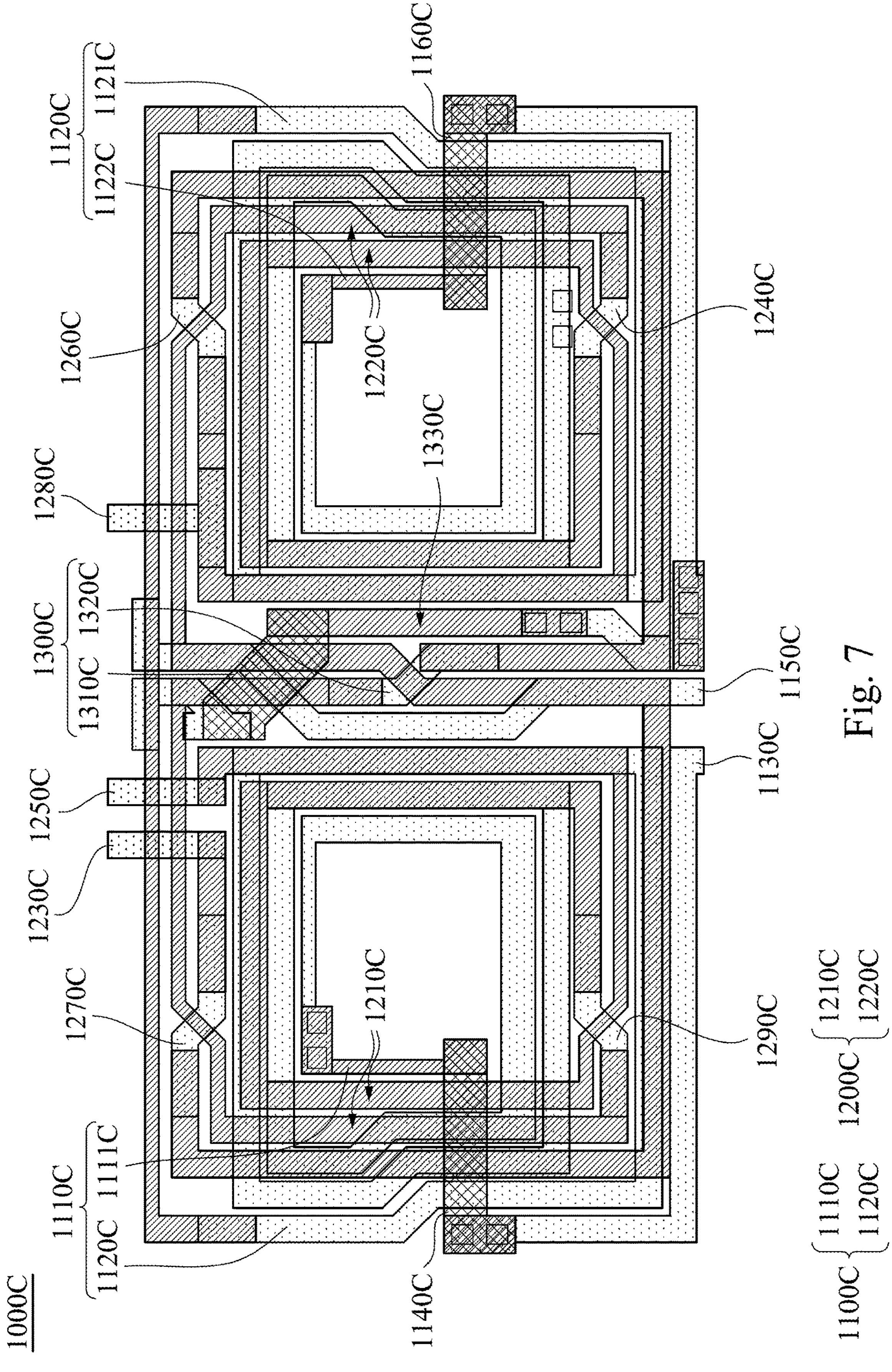
FIG. 7 depicts a schematic diagram of an inductor device according to one embodiment of the present disclosure.

FIG. 7 depicts a schematic diagram of an inductor device 1000C according to one embodiment of the present disclosure. Compared with the inductor device 1000 shown in FIG. 1, the structure disposition of the inductor device 1000C shown in FIG. 7 is different, which will be described in detail as below.

Referring to FIG. 7, the structure between the first trace 1110C and the third trace 1210C of the inductor device 1000C is adjusted, so as to make the fifth connection member 1270C located at the upper-left corner in the figure to be disposed on the first layer, and make the sixth connection member 1290C located at the lower-left corner in the figure to be disposed on the first layer.

Besides, the structure between the second trace 1120C and the fourth trace 1220C of the inductor device 1000C is adjusted, so as to make the fourth connection member 1260C located at the upper-right corner in the figure to be disposed on the first layer, and make the third connection member 1240C located at the lower-right corner in the figure to be disposed on the first layer.

In addition, the input/output terminals 1230C, 1250C of the inductor device 1000C can be disposed on the first layer, and the input/output terminals 1230C, 1250C are coupled to the third sub-trace 1210C. Furthermore, the center-tapped terminal 1280C of the inductor device 1000C can be disposed on the first layer, and the center-tapped terminal 1280C is coupled to the fourth sub-trace 1220C. It is noted that the element in FIG. 7, whose symbol is similar to the symbol of the element in FIG. 1, has similar structure feature in connection with the element in FIG. 1. Therefore, a detail description regarding the structure feature of the element in FIG. 7 is omitted herein for the sake of brevity. In addition, the present disclosure is not limited to the structure as shown in FIG. 7, and it is merely an example for illustrating one of the implements of the present disclosure.

Figure 8:
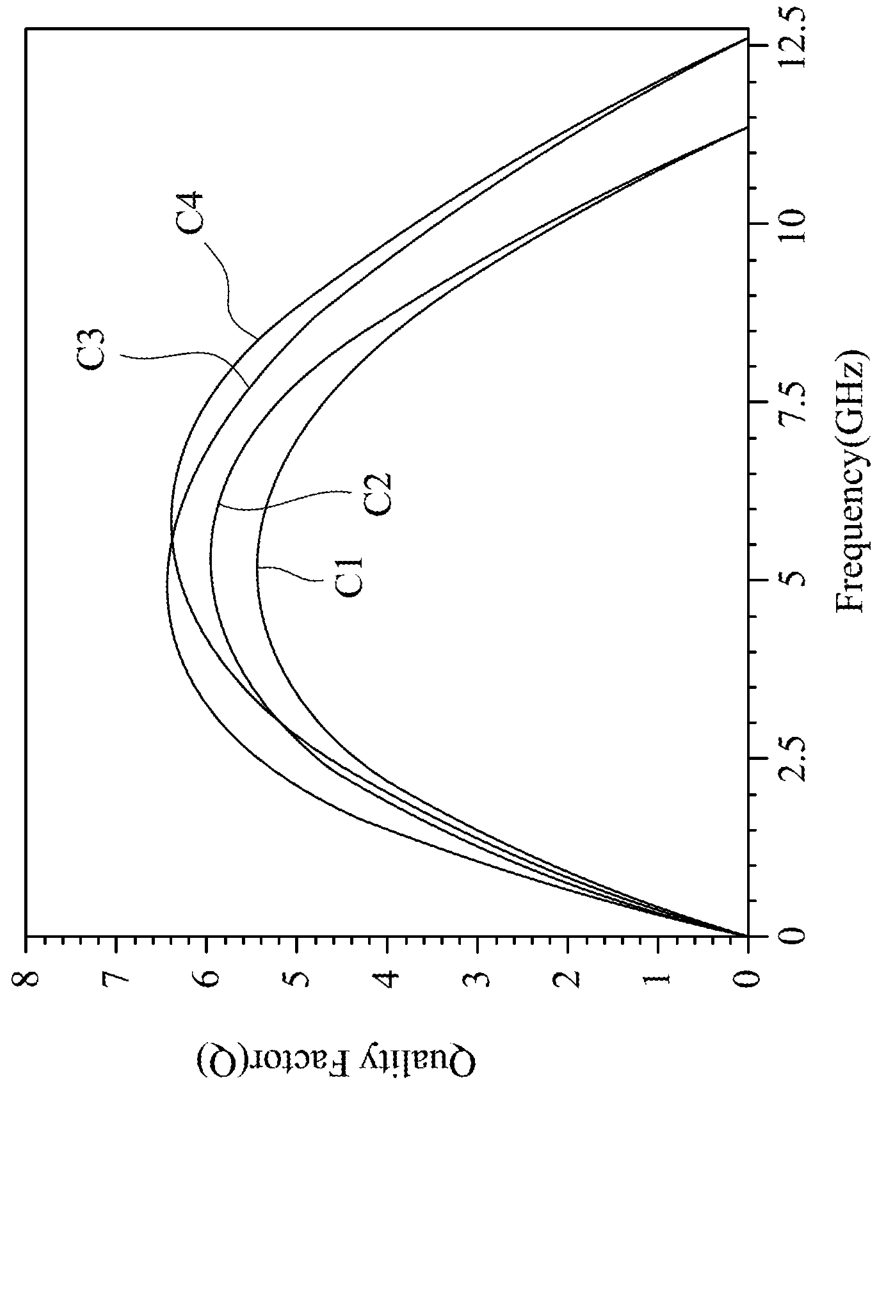
FIG. 8 depicts a schematic diagram of experimental data of an inductor device according to one embodiment of the present disclosure.

FIG. 8 depicts a schematic diagram of experimental data of an inductor device according to one embodiment of the present disclosure. As shown in the figure, the experimental curves of the quality factors of the inductor device not adopting the structural configuration of the present disclosure are C1, C2, and the experimental curves of the quality factors of the inductor device adopting the structural configuration of the present disclosure are C3, C4. As shown in the figure, the inductor device adopting the structural configuration of the present disclosure has better the quality factors.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, comprising:
- a first inductor, comprising:
  - a first trace, wherein the first trace comprises a first spiral trace, wherein the first spiral trace is disposed on a first layer and a second layer;
  - a second trace, wherein the second trace comprises a second spiral trace, wherein the second spiral trace is disposed on the first layer and the second layer; and
  - a second connection member, disposed on a third layer, wherein the second spiral trace which is located on the second layer is coupled to the second spiral trace which is located on the first layer through the second connection member;
- a second inductor, comprising:
  - a third trace; and
  - a fourth trace, wherein the third trace and the fourth trace are symmetrical to each other; and
- a connection portion, configured to couple to the first inductor and the second inductor, wherein the connection portion comprises a first sub-connection portion, configured to couple to the second spiral trace which is located on the first layer and the first spiral trace which is located on the first layer.

2. The inductor device of claim 1, wherein the first inductor is located on the first layer and the second layer, and the second inductor is located on the second layer, and the connection portion is located on the first layer and the third layer.

3. The inductor device of claim 1, wherein the first inductor further comprises:
- a first input/output terminal, disposed on the first layer, and coupled to the first spiral trace which is located on the second layer, wherein the first spiral trace which is located on the second layer is coupled to the first spiral trace which is located on the first layer.

4. The inductor device of claim 3, wherein the first inductor further comprises:
- a first connection member, disposed on the third layer, wherein the first input/output terminal is coupled to the first spiral trace which is located on the second layer through the first connection member.

5. The inductor device of claim 1, wherein the first inductor further comprises:
- a second input/output terminal, disposed on the first layer, and coupled to the second spiral trace which is located on the first layer, wherein the second spiral trace which is located on the first layer is coupled to the second spiral trace which is located on the second layer.

6. The inductor device of claim 1, wherein the second spiral trace which is located on the first layer and the fourth trace which is located on the second layer are overlapped to each other partially.

7. The inductor device of claim 1, wherein the first spiral trace which is located on the first layer and the third trace which is located on the second layer are overlapped to each other partially.

8. The inductor device of claim 1, wherein the second inductor further comprises:
- a third input/output terminal, disposed on the third layer, and coupled to the fourth trace which is located on the second layer.

9. The inductor device of claim 8, wherein the second inductor further comprises:
- a fourth input/output terminal, disposed on the third layer, and coupled to the fourth trace which is located on the second layer.

10. The inductor device of claim 9, wherein in a central area of the inductor device, the third trace which is located on the second layer is coupled to the fourth trace which is located on the second layer.

11. The inductor device of claim 10, wherein the second inductor further comprises:
- a center-tapped terminal, disposed on the third layer, and coupled to the third trace which is located on the second layer.

12. The inductor device of claim 11, wherein the center-tapped terminal is disposed symmetrically to the third input/output terminal and the fourth input/output terminal on a basis of the central area.

13. The inductor device of claim 10, wherein the connection portion further comprises:
- a second sub-connection portion, disposed on the first layer, wherein in the central area of the inductor device, the third trace, which is located on the second layer, is coupled through the second sub-connection portion to the fourth trace, which is located on the second layer.

14. The inductor device of claim 1, wherein the second inductor further comprises:

a third connection member, disposed on the third layer, wherein the fourth trace, which is located on the second layer, is coupled through the third connection member to the fourth trace, which is located on the second layer, in an interlaced manner.

15. The inductor device of claim 14, wherein the second inductor further comprises:

a fourth connection member, disposed on the third layer, wherein the fourth trace, which is located on the second layer, is coupled through the fourth connection member to the fourth trace, which is located on the second layer, in an interlaced manner, wherein the third connection member and the fourth connection member are located at different sides of the second inductor.

16. The inductor device of claim 1 , wherein the second inductor further comprises:

a fifth connection member, disposed on the third layer, wherein the third trace, which is located on the second layer, is coupled through the fifth connection member to the third trace, which is located on the second layer, in an interlaced manner.

17. The inductor device of claim 16, wherein the second inductor further comprises:

a sixth connection member, disposed on the third layer, wherein the third trace, which is located on the second layer, is coupled through the sixth connection member to the third trace, which is located on the second layer, in an interlaced manner, wherein the fifth connection member and the sixth connection member are located at different sides of the second inductor.

* * * * *